United States Patent [19]

Reuter et al.

[11] 4,259,081
[45] Mar. 31, 1981

[54] PROCESS OF CALCINING LIMESTONE IN A ROTARY KILN

[75] Inventors: Gerhard Reuter, Frankfurt am Main; Wolfram Schnabel, Hattersheim; Herbert Lausch, Frankfurt am Main, all of Fed. Rep. of Germany

[73] Assignee: Metallgesellschaft Aktiengesellschaft, Frankfurt am Main, Fed. Rep. of Germany

[21] Appl. No.: 898,254

[22] Filed: Apr. 20, 1978

[30] Foreign Application Priority Data

Apr. 30, 1977 [DE] Fed. Rep. of Germany ....... 2719347

[51] Int. Cl.³ .............................................. F27B 7/36
[52] U.S. Cl. .................................. 23/293 R; 34/134; 432/13; 432/14; 432/105; 422/307; 423/177
[58] Field of Search .............. 23/293 R; 422/209, 165, 422/307; 423/175–177, 438, 637, 155, 636; 34/132, 133, 137, 141; 432/105, 13, 14

[56] References Cited

U.S. PATENT DOCUMENTS

| 2,194,164 | 3/1940 | Daniels ................................. 423/175 |
| 3,206,299 | 9/1965 | Senior et al. ........................... 432/13 |
| 3,887,326 | 6/1975 | Townley ................................. 432/14 |
| 4,022,569 | 5/1977 | Farago et al. .......................... 432/14 |

FOREIGN PATENT DOCUMENTS

256687 8/1926 United Kingdom .................... 423/177

OTHER PUBLICATIONS

Perry—Chemical Engineers' Handbook 4th Ed., McGraw Hill, N.Y., 1963, pp. 20–37.

Primary Examiner—Hiram Bernstein
Attorney, Agent, or Firm—Sprung, Felfe, Horn, Lynch & Kramer

[57] ABSTRACT

A process for the calcining of limestone or hydrated lime by thermal treatment thereof with hot gases in a rotary kiln through which the kiln atmosphere and the charge are countercurrently passed, which kiln is fed with solid carbonaceous fuel, is described. The invention resides in introducing an oxygen-containing gas into a horizontal region across the rotary kiln defined by a point along the length of the kiln where ignitable particles of said solid fuel first appear and a second point along the length of said rotary kiln which is spaced from the charging end of said kiln not more than 50% of the length thereof. The oxygen-containing gases are injected through nozzle blocks in said rotary kiln, and oxygen-containing gas is introduced into the free space of said kiln.

7 Claims, 2 Drawing Figures

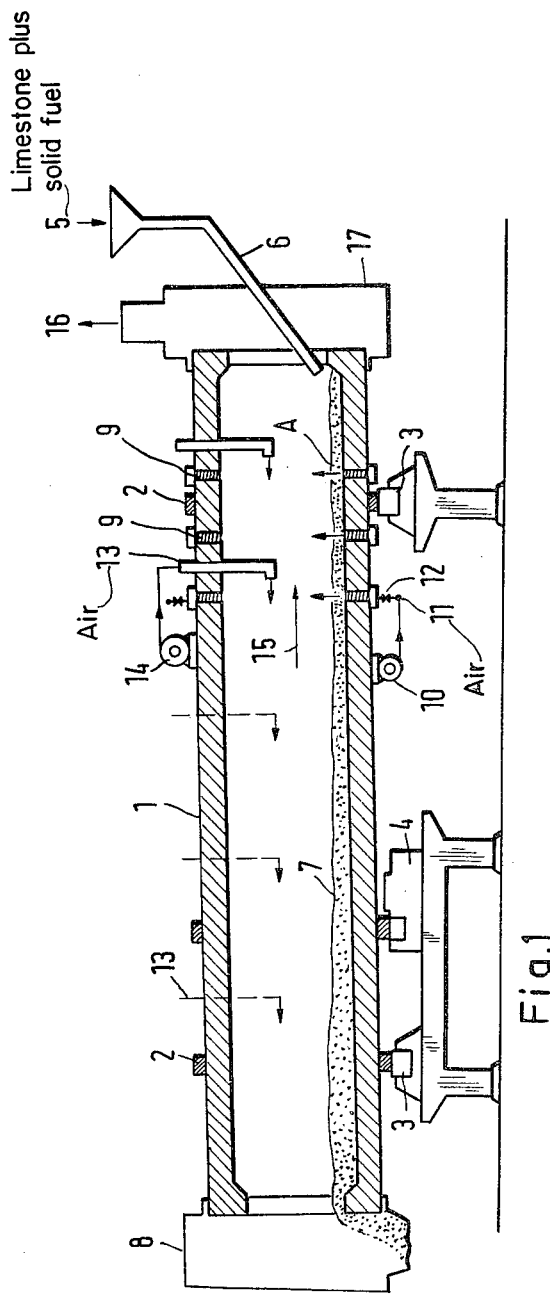
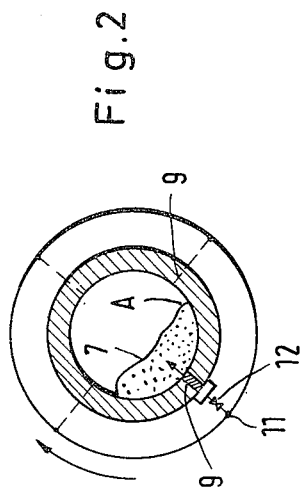

PROCESS OF CALCINING LIMESTONE IN A ROTARY KILN

This invention relates to a process of calcining limestone or hydrated lime by a thermal treatment with hot gases in a rotary kiln in which the charge is moved countercurrently to the flow of the kiln atmosphere and oxygen-containing gases are introduced into the rotary kiln through the shell thereof at a plurality of points.

Quicklime of high reactivity is produced on an increasing scale by calcination in a rotary kiln because this results in a lime of higher and more uniform quality than the calcination in a shaft kiln although the latter has a lower heat consumption. The resulting lime is used mainly in steel production and must have only a small sulfur content. The sulfur content of the lime is mainly due to the sulfur content of the fuels which have been used. This sulfur content can be minimized mainly by the use of low-sulfur fuels and by the use of a rotary kiln wherein the charge is heated by hot combustion gases which are produced in a central turner or in shell burners or shell nozzles whereby direct contact of the unburnt fuel with the charge is avoided (Zemert—Kalk—Gips, No. 2, 1969, pages 75–81; French patent specification No. 1,487,240; U.S. Pat. No. 2,941,791; German patent specification No. 618,872).

Since low-sulfur fuels are more expensive than fuels containing more sulfur, the use of the former increases the cost of the process, particularly owing to the higher heat requirement. In a rotary kiln there is only a very poor transfer of heat from the flames and the hot gases of the kiln atmosphere to the solid charge, particularly in the heating-up zone. This is due to the fact that the heat is transferred mainly at the surface of the charge. As a result, the exhaust gases have a high content of heat which has been generated by the combustion of relatively expensive fuels. This is true also for processes in which the sulfur content of the quicklime is minimized by conducting the calcination in a neutral or reducing atmosphere (German patent specification No. 1,108,603; Czechoslovakian patent specification No. 127,978). This practice involves also a risk of temperature fluctuations and local overheating in response to a fluctuation of the oxygen supply. This risk can be avoided only in part by the use of expensive sealing means for preventing an inleak of air.

It is an object of the invention to reduce the heat consumption of a rotary kiln used to produce low-sulfur quicklime of high reactivity.

In accordance with the invention this object is accomplished by producing at least part of said hot gases by feeding solid carbonaceous fuel into the rotary kiln at the charging end thereof, injecting oxygen-containing gases through nozzle blocks into charge material disposed over said nozzle blocks at a horizontal region of the rotary kiln which is defined by a point along the length of the kiln where ignitable particles of said solid fuel first appear a second point along the length of said rotary kiln which is spaced from the charging end of said rotary kiln by not more than 50% of the length of the kiln, and injecting oxygen-containing gases through shell pipes into the free space of said rotary kiln at least into said horizontal region.

The solid carbonaceous fuel which is employed has a particle size up to 100 mm. Solid fuel having a particle size below about 1 mm may be moistened, if required, so that it will not be entrained by the exhaust gases. Fuels which have a low sulfur content and release only small amounts of $SO_2$ and $SO_3$ are preferred. Solid fuels having a high content of volatile combustible substances are particularly suitable, e.g., certain low-sulfur brown coals.

Ignitable particles of the solid fuel first appear on the lower part of the surface of the rolling charge. As the individual particles roll down on the surface of the rolling bed, the particles are heated by the hot kiln gases and reach the ignition temperature at a certain distance from the charging end, shortly before they are drawn into the rolling bed. At that point, the injection of oxygen-containing gases into the charge through nozzle blocks begins. As a result, those particles of the solid fuel which are ignitable or have been ignited are not cooled below the ignition temperature as they are drawn into the colder interior of the rolling bed but continue to burn in the interior of the rolling bed. The combustion which then takes place is in the nature of a chain reaction, releasing additional amounts of volatile constituents. This combustion-chain reaction spreads throughout the cross-section of the charge. The heat content of the volatile combustible constituents is thus fully utilized to heat the charge, and the heat exchange surface area which is available for a heat transfer is much increased.

Additional nozzle blocks are provided at points which are spaced, e.g., 2.5 to 3.5 meters apart along the heating-up zone. This spacing is generally sufficient to enable an injection of oxygen into the bed at a sufficiently high rate without weakening the kiln structure. The nozzle blocks provided at each injection station form an annular series and extend radially and are spaced apart around the periphery of the kiln, the peripheral spacing amounting usually also to 2.5 to 3.5 meters. Control mechanisms are provided which ensure that in each annular series of nozzle blocks only those nozzle blocks which are disposed under the charge are supplied with oxygen-containing gas. The term "nozzle block" describes, but is not limited to, a duct which extends through the kiln wall and the refractory lining of the rotary kiln and has an outlet opening which is flush with the inside surface of the refractory lining or protrudes or is recessed from said surface by a small distance. The nozzle blocks may consist of ceramic or metallic materials. Radially extending shell pipes, which are spaced apart along the rotary kiln, are used to supply oxygen-containing gases into the free kiln space in the heating-up zone. The outlet openings of the shell pipes are disposed approximately at the center of the cross-section of the kiln and their axes are parallel to the longitudinal axis of the kiln. In this arrangement the outlet openings are not covered by the charge so that only one shell pipe is required in each blowing-in station.

In order to advance the point of ignition, combustible low-sulfur gaseous substance can be added to the oxygen-containing gases which are injected through the nozzle blocks. The combustible substances which are added may supplement the combustible volatile constituents of the solid reducing agent if the same has only a low content of said constituents.

When the entire heat consumed in the rotary kiln is supplied by the solid fuel which is charged at the charging end, the adjoining kiln portion is supplied with oxygen-containing gases through shell pipes and, if desired, from the discharge end. Any additional fuel which must be introduced into the adjoining portion of the rotary kiln is supplied through shell burners and/or a central burner. Gaseous, liquid or dustlike solid fuels, which have a low sulfur content and/or release $SO_2$ and $SO_3$ only in small quantities, may be used for this purpose.

In a preferred embodiment of the invention, the region in which oxygen-containing gases are injected through nozzle blocks begins at a point where the solid fuel is at a temperature of about 300° C. and is terminated at a point where the charge is at a temperature of 800° to 950° C. As described hereinbefore, the lower temperature of the solid fuel is measured in the lower portion of the surface of the rolling bed formed by the charge, shortly before the point where the fuel particles are drawn into the rolling bed. The upper temperature is the average temperature of the entire rolling bed formed by the charge because the temperature in the rolling bed has been equalized to a considerable extent when that temperature is reached. The selection of that temperature range ensures that the charge will not be cooled by the injected gases in the lower temperature range and that substantially all volatile constituents will have been released in the upper temperature range.

According to a preferred feature, the charge is maintained at a temperature of 900° to 1100° C., preferably 950° to 1050° C., in the calcining zone. This results in the production of a highly reactive quicklime.

According to a preferred feature, the length of the calcining zone is at least 50% and preferably 55 to 70% of the length of the kiln. The selection of this length gives particularly good results in conjunction with a rapid temperature rise. An even longer calcining zone may be used if the charge is preheated before being fed to the kiln.

The advantages afforded by the invention reside in that the length of the heating-up zone of the rotary kiln is greatly reduced and, as a result, either the throughput rate of a given kiln is increased or a smaller kiln may be used for a given throughput rate. Besides, the difference between the gas temperature and the bed temperature is minimized and the exhaust gas temperature is minimum too. The lower heat content per unit of volume reduces the danger of a formation of crusts and increases the durability of the refractory lining. The total energy consumption is much reduced because the heat content of the volatile combustible constituents of the solid fuel is utilized to a large extent, the gas temperature in the free kiln space and consequently in the exhaust gases is reduced, and the direct gasification of carbon on the bed is decreased because the accumulation of heat which would otherwise be possible here is avoided.

BRIEF DESCRIPTION OF THE DRAWINGS

The attached drawings shows schematically a typical rotary kiln which can be used in the process of this invention. According to FIG. 1 there is shown longitudinal section of the kiln. Rotary furnace 1 is suspended on curved rails 2 for rotary movement. Curved rails 2 are supported by rail supports 3. The rotary furnace 1 is rotated by a driving mechanism 4 consisting of a motor and a ring gear. The charge 5 consisting of limestone and solid carbonaceous material is charged through supply conduit 6 into the charging end of the kiln 1. The bed 7 of the charge travels through the kiln 1 and is discharged from the discharge end of the kiln and head 8. In the heating-up zone of the kiln 1 there are provided annular series of nozzle blocks 9. Air is supplied by the blower 10 to an annular supply conduit 11 and from this to nozzle blocks 9 which are disposed under the solid charge 7. The air supply to those nozzle blocks 9 which are disposed under the charge 7 is performed by opening their respective valves 12. The valves 12 of nozzle blocks 9 which are not disposed under the solid charge 7 are closed. The air supply to the other annular series of nozzle blocks is not shown. In the heating-up zone there are provided additionally shell pipes 13 which are supplied with air by the blower 14 constantly. Only one blower and supply is shown. In the calcining zone there are disposed further shell pipes (or shell burners) 13 which are shown by dotted lines. The kiln atmosphere flows in the direction of arrow 15. The discharge orifices of shell tubes 13 can be disposed against or in the direction of flow of the kiln atmosphere. The waste gas 16 is sucked off from head 17. Ignitable particles of the solid carbonaceous material appear at point A in the heating-up zone. About at that point the injection of air through the bed 7 starts through the nozzle blocks 9 of the first annular series of nozzle blocks and is continued in the following annular series of nozzle blocks 9, terminating at the least by 50% of the kiln length. The calcining zone begins some distance behind the last annular series of nozzle blocks. The calcining zone begins where an average temperature of the charge bed of about 900° to 950° C. is reached.

FIG. 2 shows a schematic cross section through the first annular series of nozzle blocks 9 showing four nozzle blocks 9 from which three are shown by dotted lines only. These three nozzle blocks 9 are closed and supply no air into the kiln whereas the fully shown nozzle block 9 is open and supplies air into the bed 7. Ignitable particles of the solid carbonaceous material appear first in the lower part of the surface of the rolling bed 7. This point is marked as A.

Both figures and the position of nozzle blocks and shell tubes are not shown true in size but only schematically.

EXAMPLE

A pilot rotary kiln of 0.9 meter inside shell diameter and 9 meter length was used for burning limestone.

In a first run all of the necessary heat was introduced by a central burner disposed at the discharge end of the kiln by combustion of 50 standard cubic meter of town gas per hour. The maximum gas temperature in the calcining zone was 1600° C., the maximum charge temperature was 1200° C., the waste gas temperature was 980° C. and the production of burnt lime was 120 kilogram per hour.

In a second run the maximum gas temperature in the calcining zone was 1200° C., the maximum charge temperature was 980° C. and the production of burnt lime was 80 kilogram per hour.

In a third run the kiln equipped with nozzle blocks and shell pipes in the heating-up zone according to the invention, shell burners in the calcining zone and a central burner. The shell burners are fed with 15 standard cubic meter of town gas per hour and the same amount was fed to the central burner. Brown coal in an amount of 25 kilogram per hour (calorific value 4500 kcal/kg) was charged together with the limestone into the charging end of the kiln. The air supply was about the stoichiometric amount in regard to the respective fuel. The maximum gas temperature in the calcining zone was 1200° C., the maximum charge temperature was 980° C., the waste gas temperature was 770° C. and the production of burnt lime was 120 kilogram per hour.

According to run three it was possible to obtain a highly reactive quicklime with a considerable higher throughput compared with that of run two and with the same throughput than the highly burnt lime produced in run one.

We claim:

1. In a process for the calcining of limestone or hydrated lime by thermally treating the same with hot gases in a rotary kiln through which the kiln atmosphere and the limestone or hydrated lime charge are countercurrently passed and into which oxygen containing gases are introduced through shell pipes at a plurality of points, the improvement which comprises producing at least part of said hot gases by feeding solid carbonaceous fuel into the rotary kiln at the charging end thereof, injecting oxygen-containing gases through nozzle blocks into charge material disposed over said nozzle blocks at a horizontal region of the rotary kiln which is defined by a point along the length of the kiln where ignitable particles of said solid fuel first appear and a second point along the length of said rotary kiln which is spaced from the charging end of said rotary kiln by not more than 50% of the length of the kiln, and injecting oxygen-containing gases through shell pipes into the free space of said rotary kiln at least into said horizontal region.

2. A process according to claim 1 wherein the region into which oxygen-containing gases are injected through nozzle blocks begins at a point where the solid fuel has a temperature of about 300° C. and terminates at a point where the charge has a temperature in the range of 800° to 950° C.

3. A process according to claim 2 wherein the temperature of the charge in the calcining zone is maintained at 900° to 1,100° C.

4. A process according to claim 3 wherein the temperature of the charge in the calcining zone is maintained at 950° to 1,050° C.

5. A process according to claim 3 wherein the length of the calcining zone is at least 50% of the length of the kiln.

6. A process according to claim 5 wherein the length of the calcining zone is 55 to 70% of the length of the kiln.

7. A process according to claim 1, wherein air is introduced in a heating-up zone of said rotary kiln through nozzle blocks into a mixture of limestone and fuel disposed there-above.

* * * * *